(12) United States Patent
Olander

(10) Patent No.: US 6,845,619 B2
(45) Date of Patent: Jan. 25, 2005

(54) INTEGRATED SYSTEM AND PROCESS FOR EFFLUENT ABATEMENT AND ENERGY GENERATION

(75) Inventor: W. Karl Olander, Indian Shores, FL (US)

(73) Assignee: Advanced Technology Materials, Inc., Danbury, CT (US)

(*) Notice: Subject to any disclaimer, the term of this patent is extended or adjusted under 35 U.S.C. 154(b) by 0 days.

(21) Appl. No.: 10/316,577

(22) Filed: Dec. 11, 2002

(65) Prior Publication Data

US 2004/0112056 A1 Jun. 17, 2004

(51) Int. Cl.[7] ............................................. F01K 25/06
(52) U.S. Cl. ............................ 60/649; 60/651; 60/671
(58) Field of Search ........................... 60/649, 651, 671

(56) References Cited

U.S. PATENT DOCUMENTS

| | | | | |
|---|---|---|---|---|
| 3,772,879 A | * | 11/1973 | Engdahl ...................... 60/671 |
| 3,975,913 A | * | 8/1976 | Erickson ...................... 60/645 |
| 4,175,381 A | * | 11/1979 | Scragg et al. ............... 60/39.12 |
| 4,191,021 A | * | 3/1980 | Nakamura et al. ............ 60/657 |
| 4,842,621 A | | 6/1989 | Robbins et al. |
| 5,512,082 A | | 4/1996 | Zarchy et al. |
| 5,976,723 A | | 11/1999 | Boffito et al. |
| 6,230,494 B1 | * | 5/2001 | Botti et al. .................... 60/649 |
| 6,461,752 B1 | * | 10/2002 | Leung ......................... 429/20 |

FOREIGN PATENT DOCUMENTS

WO  2004/018080 A1  3/2004

* cited by examiner

*Primary Examiner*—Hoang Nguyen
(74) *Attorney, Agent, or Firm*—Margaret Chappuis; Steven Hultquist, Esq.

(57) ABSTRACT

The present invention relates to an effluent abatement/energy generation system, as well as a method, for abating a process effluent gas stream that contains one or more target compounds such as hydrogen gas, ammonia gas, isopropanol, and other volatile organic compounds that are readily oxidizable, and for concurrently generating energy using such process effluent gas stream. Such effluent abatement/energy generation system comprises a purification unit for removing components other than such target compounds from the process effluent gas stream, and an energy generation unit for generating thermal and/or electrical energy. Such energy generation unit may comprise a combustion assembly, such as a microturbine, for direct combustion or catalytic combustion of the target compounds to generate thermal and/or electrical energy. Such energy generation unit may also comprise a fuel cell for using the target compounds to generate electrical energy.

57 Claims, 1 Drawing Sheet

INTEGRATED SYSTEM AND PROCESS FOR EFFLUENT ABATEMENT AND ENERGY GENERATION

FIELD OF THE INVENTION

The present invention in general relates to systems and methods for abating effluent stream that contains hydrogen gas, ammonia gas, and/or other volatile organic compounds that are readily oxidizable, such as isopropanol (IPA), and concurrently using such effluent stream to generate thermal and/or electrical energy.

BACKGROUND OF THE RELATED ART

Many semiconductor-manufacturing processes use hydrogen and/or ammonia gases. For example, the chemical vapor deposition (CVD) and the metalorganic chemical vapor deposition (MOCVD) processes employ hydrogen gas flow of about 30 to 100 standard liters per minute (SLPM). Silicon epitaxy processes also employ large hydrogen gas flow of above 50 SLPM. Gallium nitride manufacturing process typically uses ammonia flow of about 15 to 60 SLPM (50 to 150 SLPM for scale-up manufacturing processes), in addition to hydrogen flow of about 30 to 50 SLPM. Various metal nitrification processes require large flow of ammonia gas as the nitrogen source.

Since hydrogen gas is used either as a carrier gas or as a reducing agent in these processes, only a very small portion, if any, of the hydrogen gas introduced is actually consumed, and majority of such hydrogen gas is discharged with the process effluent gas stream. Such discharged hydrogen gas is either directly vented into the surrounding environment, or abated via combustion. Direct venting of the hydrogen gas can cause flames, or even explosions near the venting site, if the hydrogen concentration thereat reaches the flammability limit, which can be as low as 4% for hydrogen. The combustion of hydrogen gas, on the other hand, requires fuel and ignition equipments, and is therefore more costly than direct venting.

One object of the present invention therefore is to co-generate thermal and/or electrical energy during hydrogen abatement process, by deriving energy from the hydrogen gas, so as to reduce the overall energy consumption of the abatement process as well as the abatement costs. Hydrogen gas in the process effluent gas stream is therefore used as an energy source, which may provide energy to support the abatement process or other energy-consuming units of the semiconductor manufacturing facilities, or even being sold to the grid to as a revenue-generating commodity.

The conventional ammonia abatement methods use either wet scrubbing or combustions techniques. During wet scrubbing, the ammonia gas is scrubbed by an acid solution (e.g., HCl) to form a stable ammonia compound, such as ammonia chloride, and then discharged into the environment. The disadvantages of such wet scrubbing method include: (1) a large amount of water is consumed for scrubbing/dissolving the ammonia gas, and (2) the acid solution used during wet scrubbing itself constitutes contamination. The combustion method, on the other hand, converts the ammonia gas into water and nitrogen gas via combustion. The disadvantages of such combustion method include: (1) fuel and thermal energy are required for combusting the ammonia, which renders such method costly, and (2) $NO_x$, which is a pollutant to the environment, is produced as a byproduct during the combustion.

Another object of the present invention therefore is to provide a method for co-generate thermal and/or electrical energy during ammonia abatement process, by deriving energy from the ammonia gas, and without incurring the above-described disadvantages of the conventional ammonia abatement methods.

Furthermore, certain volatile organic solvents contained in the semiconductor manufacturing process effluent gas stream, such as isopropanol, can also be abated using the method of the present invention, where the abatement and energy generation are concurrently carried out.

A further object of the present invention is to provide a self-sufficient system for effluent abatement and energy generation, while a part of the energy generated by such system is used to support the operation of such system, so that such operation is less dependent on fossil fuels. Moreover, the excess energy produced by such system can be returned to the manufacturing facility or sold to the grid.

Other objects and advantages will be more fully apparent from the ensuing disclosure and appended claims.

SUMMARY OF THE INVENTION

One aspect of the present invention relates to an effluent abatement/energy generation system, arranged and constructed for receiving a process effluent gas stream that contains one or more target components selected from the group consisting of hydrogen gas, ammonia gas, and volatile, oxidizable organic compounds, such system comprising:
 (a) a purification unit for removing one or more component(s) other than such target components from the process effluent gas stream; and
 (b) an energy generation unit for generating thermal and/or electrical energy from such target components, and/or one or more derivatives of such target components.

The term "derivatives of the target components" as used herein refers to any compounds or products generated from such target components through any chemical or physical treatments. For example, hydrogen gas is a derivative of ammonia gas, as produced therefrom via catalytic decomposition of ammonia gas.

The term "volatile, oxidizable organic compounds" as used herein refers to any volatile organic solvents used during semiconductor manufacturing processes. Some of such organic solvents are listed in U.S. Pat. Nos. 6,399,208, 6,337,148, and 6,102,993, the contents of which are incorporated herein by reference in their entireties for all purposes. Preferably, such organic solvents are C1–C8 aryls, ketones, ethers, alcohols, glymes, amines, polyamines, glycols, aliphatic hydrocarbon solvents, aromatic hydrocarbon solvents, cyclic ethers, and compatible combinations of two or more of the foregoing. More preferably, such organic solvents comprise C1–C8 alcohols, and most preferably isopropanol.

Another aspect of the present invention relates to a method for abating a process effluent gas stream that contains one or more target components selected from the group consisting of hydrogen gas, ammonia gas, and volatile, oxidizable organic compounds, and for concurrently using such process effluent gas stream to generate energy, comprising the steps of:
 (a) receiving the process effluent gas stream from an upstream manufacturing facility;
 (b) removing one or more components other than such target components from the process effluent gas stream; and
 (c) using the target components contained by the process effluent gas stream and/or one or more derivatives of such target components to generate thermal and/or electric energy.

Other aspects, features and advantages of the invention will be more fully apparent from the ensuing disclosure and appended claims.

DETAILED DESCRIPTION OF THE INVENTION, AND PREFERRED EMBODIMENTS THEREOF

Figure 1:
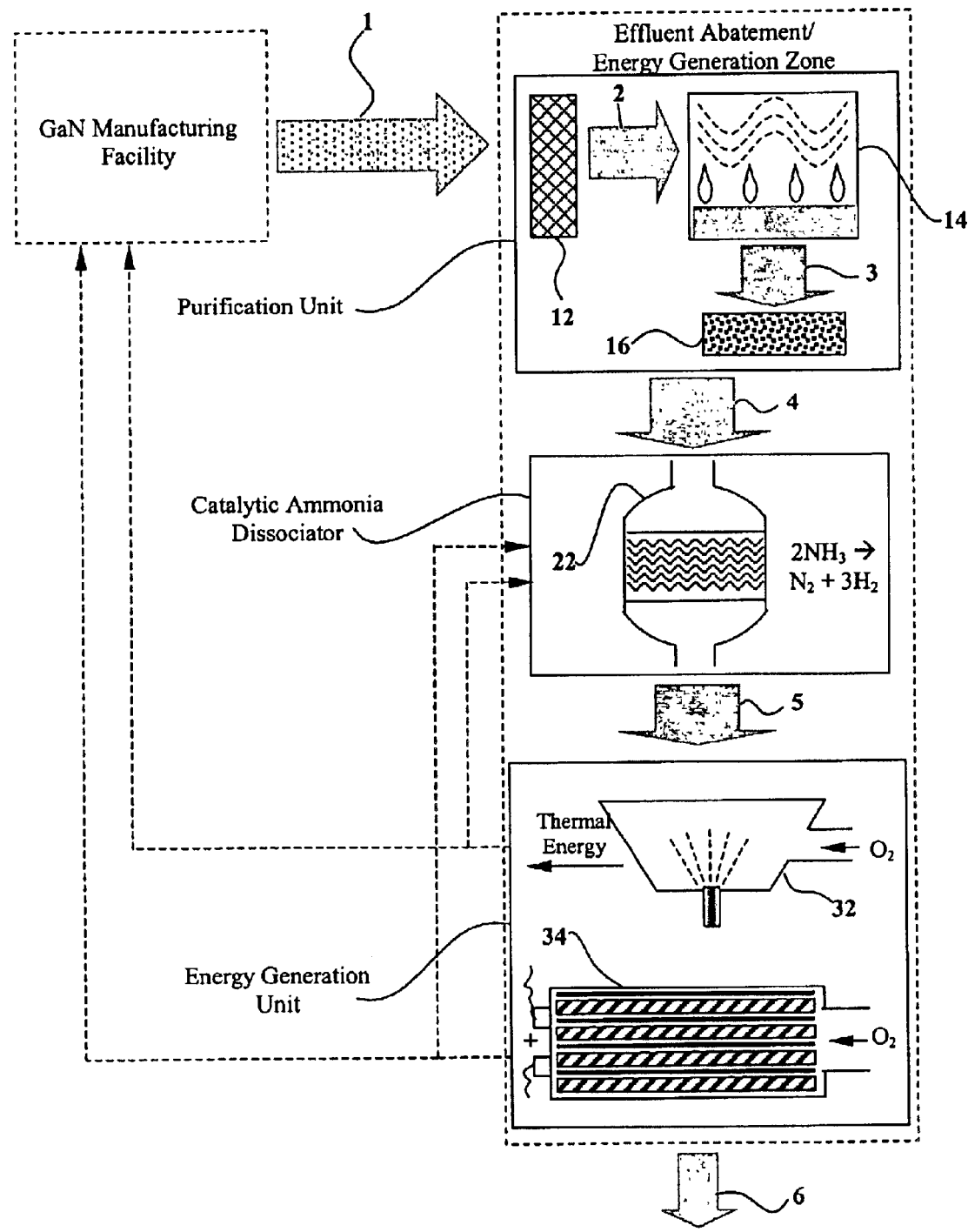
FIG. 1 is a schematic view of an effluent abatement/energy generation system, according to one embodiment of the present invention, as arranged and constructed to receive a process effluent gas stream from an upstream gallium nitride manufacturing facility.

The present invention provides a cost-effective integral system for simultaneous effluent abatement and energy generation, by converting waste hydrogen, ammonia, or oxidizable organic compounds contained in industrial effluent streams, specifically effluent streams from semiconductor manufacturing facilities, into useful electrical energy and/or thermal energy.

Such electrical energy and/or thermal energy can be used for supporting either the abatement operation or the semiconductor manufacturing operating, or both, therefore substantially reducing the overall energy consumption and the abatement costs. Moreover, the discharge from such integral effluent abatement/energy generation system consists mostly of water and nitrogen gas, both of which are environmentally safe and can be directly discharged without further treatment. Therefore, such integral effluent abatement/energy generation system also provides a clean source of energy.

The integral effluent abatement and energy generation system of the present invention can be arranged downstream of one or more semiconductor manufacturing facilities, such as GaN or SiN manufacturing facilities, CVD or MOCVD processing facilities, silicon epitaxy processing facilities, or nitrification facilities, to receive process effluent gas stream(s) therefrom.

Such process effluent gas stream contains one or more energy-generating target components, such as hydrogen gas, ammonia gas, volatile and oxidizable organic compounds, as well other impurities, such as solid particles, toxic by-products, chemical vapors, un-reacted precursor materials, etc., as generated during the manufacturing processes. For example, process effluent gas streams from CVD/MOCVD and silicon epitaxy processing facilities usually contain substantial amount of unused hydrogen gas that is introduced into the systems as carrier gas or reducing agent; process effluent gas streams from nitrification processes contain mostly ammonia gas, which provides the nitrogen source for such processes; and process effluent gas streams from GaN and SiN manufacturing facilities comprise both hydrogen and ammonia gases.

The effluent abatement and energy generation system therefore comprises at least two units: (1) a purification unit for removing impurities other than the energy-generating target components from the process effluent gas stream to be treated; and (2) an energy generation unit for generating thermal and/or electrical energy from the process effluent gas stream.

The specific components of such effluent abatement and energy generation system are described in detail in the following sections:

I. Purificiation Unit

The purification unit of the effluent abatement and energy generation system may comprise one or more components selected from the group consisting of: a filter, a condensation device, a chemical scrubber, and a desiccating device.

The list provided hereinabove and the disclosure provided hereinafter are only illustrative, not exhaustive, and they are not intended to limit the broad scope of the present invention in any manner. Any other suitable devices useful for removing impurities other than the energy-generating target compounds can be used in the system of the present invention, which is readily determinable by a person ordinarily skilled in the art, based on the specific types of impurities contained in the process effluent gas stream to be treated.

The filter may comprise any type of physical and/or chemical absorbents, for removal of solid particles from the process effluent gas stream. For example, such filter may comprises absorbent materials selected from the group consisting of carbon fibers, activated carbon, graphite, amorphous carbon, zeolites, molecular sieves, silica gels, activated alumina, etc.

After removal of the solid particles from the process effluent gas stream, such stream can be passed through a condensation or cooling device, in which condensable components of such process effluent gas stream, such as chemical vapors formed by most un-reacted metalorganic precursor materials, are removed therefrom via condensation. Moreover, such condensed precursor materials can be further purified for reuse by the semiconductor manufacturing processes, which enhances the production efficiency and reduces waste rate.

The filtered/condensed process effluent gas stream may still comprise small amount of gaseous by-products and un-reacted source reagents, which can be further removed by a chemical scrubber containing one or more solid or liquid scrubbing agents. Preferably, such chemical scrubber may be a dry scrubber comprising one or more packed beds of solid scrubbing agents that are reactive with such by-products and un-reacted source reagents.

Alternatively, such chemical scrubber is a wet scrubber comprising one or more nozzles for spraying one or more liquid scrubbing agents or aqueous scrubbing solutions onto the process effluent gas stream for dissolving and removing the by-products and un-reacted source reagents. Such chemical scrubber can also be a wet-dry combination scrubber containing both wet and dry scrubbing sections. If wet scrubbing is used, it is preferred that a downstream desiccating device is provided for removing the excessive moisture introduced during the wet scrubbing process from the process effluent gas stream.

Such purification steps are important for protecting components of the downstream energy generation unit, because impurities contained in the process effluent gas stream may form solid deposits therein, clogging the fluid paths, or poison catalytic materials used therein.

II. Catalytic Ammonia Dissociator

If the process effluent gas stream to be treated contains substantial amount of ammonia gas, such effluent abatement and energy generation system may further comprise a catalytic ammonia dissociator between the purification unit and the energy generation unit, for dissociating or cracking the ammonia gas into hydrogen and nitrogen gases, wherein the hydrogen gas is consumed or abated during subsequent energy generation process, resulting in water, which can be safely discharged together with the nitrogen gas out of the system.

Ammonia is hazardous to the environment and cannot be discharged without treatment. Conventional ammonia abatement methods are not satisfactory, due to the water/energy consumption required and the hazardous end-products generated thereby, as explained hereinabove.

The present invention hereby provides an ammonia dissociator for cracking the ammonia gas in the process effluent gas stream down to hydrogen and nitrogen gases (volume ratio 3:1) in a catalytic environment, wherein the hydrogen gas so formed can be further used for energy generation, and the nitrogen gas so formed is an environmentally safe end-product, which can be directly discharged into the environment without further treatment.

Therefore, the ammonia gas in the process effluent gas stream is not only effectively abated, but it also provides a clean energy source for energy production, with little added costs to the manufacturer.

The ammonia dissociator comprises a reactor bed containing packed catalyst for catalyzing the decomposition of ammonia into hydrogen and nitrogen gases.

Any catalyst capable of decomposing ammonia into $H_2$ and $N_2$ can be used for practicing the present invention. Preferably, such catalyst comprises one or more metal or metal alloys selected from the group consisting of Group IIIA metals (Sc, Y, La), Group IVA metals (Ti, Zr, Hf), Group VA metals (V, Nb, Ta), Group VIA metals (Cr, Mo, W), Group VIIA metals (Mn, Re), Group VIIIA metals (Fe, Co, Ni, etc.), Group IIB metals (Cu, Ag, Au), Group IIB metals (Zn, Cd, Hg), Pt, Pd, Ru, Ir, and alloys thereof. More preferably, such catalyst comprises one or more metal or metal alloys from Groups VIA, VIIA, and VIIIA, particularly Fe, Ni, Co, Cr, Mn, Pt, Pd, and Ru.

The ammonia decomposition catalyst disclosed in U.S. Pat. No. 5,976,723, can also be used in the present invention, while the contents of such U.S. Patent are incorporated herein by reference in their entirety for all purposes. The catalysts of U.S. Pat. No. 5,976,723 comprises: (a) alloys having the general formula $Zr_{1-x}Ti_xM_1M_2$ wherein $M_1$ and $M_2$ are selected independently from the group consisting of chromium, manganese, iron cobalt, and nickel, wherein x is in the range of from about 0.0 to 1.0 inclusive, and (b) between about 20% by weight and about 50% by weight of aluminum.

The ammonia decomposition catalysts used in the practice of the present invention may be either supported or non-supported. A preferred non-supported catalyst would be a pure metallic woven mesh, more preferably a nickel woven mesh. It is also preferred that the catalysts be supported on any suitable support, including but not limited to, monoliths, fiber mats, and particles. The supports will preferably comprise carbon or a metal oxide, such as alumina, silica, silica-alumina, titania, magnesia, aluminum metasilicates, and the like. The most preferred supports are comprised of alumina, and the preferred support structure in a monolith. Monoliths are preferred because they allow for relatively high gas flow rates, since they contain a plurality of finely divided gas flow passages extending therethrough. Such monolithic structures are often referred to as "honey-comb" type structures. A preferred form of such a structure is made of a refractory, substantially inert rigid material that is capable of maintaining it s shape and has a sufficient degree of mechanical strength at high temperatures, for example, up to about 1200° C.

The ammonia decomposition reaction is an endothermic reaction, and therefore thermal energy is required for maintaining the reaction bed at elevated temperatures sufficient for such decomposition reaction.

The process effluent gas stream containing ammonia or a mixture of ammonia and hydrogen therefore is passed into the reaction bed of the ammonia dissociator, wherein such reaction bed is heated up to an elevated temperature in a range of from about 500° C. to about 1200° C., preferably from about 700° C. to about 1000° C., more preferably of about 800° C., and the reaction pressure within such reaction bed is preferably controlled within a range of from about 5 psig to about 15 psig, more preferably about 10 psig. The catalysts in such reaction bed, when contacted with the ammonia gas at such elevated temperature, can convert 99.99% of the ammonia gas into its hydrogen and nitrogen constituents.

The above-described ammonia dissociator can be readily obtained from various manufacturers. For example, S.M. Engineering Co. Inc. at North Attleboro, Mass. provides various ammonia dissociators that can be used for the practice of the present invention.

In a preferred embodiment of the present invention, the process effluent gas stream is first compressed before feeding into the reaction bed, since such compression increases the temperature of such process effluent gas stream, therefore reducing the energy consumption for heating up the gas stream to the required elevated temperature, as well as enhancing the ammonia dissociation efficiency.

The dissociated process effluent gas stream consists primarily of hydrogen and nitrogen gases, which can be readily used for energy generation.

III. Energy Generation Unit

The energy generation unit of the present invention may comprise one or more components for generating either electrical energy or thermal energy, or both, from the energy-generating target components, which may comprise hydrogen gas, ammonia gas, and/or volatile organic compounds (e.g., isopropanol), or derivatives of such target components, such as hydrogen gas formed by catalytic dissociation of the ammonia gas.

The most direct way of deriving thermal energy out of such target components is via thermal combustion. Therefore, a thermal combustion assembly can be used in the energy generation unit for direct burning of the target components, wherein such thermal combustion assembly comprises heat exchanger tubes or steam generators, for outputting the thermal energy so produced directly through heat exchanging fluids or through steam generation.

In a preferred embodiment of the present invention, part of the thermal energy output from the thermal combustion assembly can be used for heating up the ammonia dissociator and for operating the abatement/energy generation system, and therefore forming a self-sufficient system where no external thermal energy source is needed for operation thereof. In another preferred embodiment of the present invention, part of the thermal energy from the combustion assembly is also used for supporting the upstream semiconductor manufacturing process.

When ammonia is thermally combusted, NOx may be formed as a byproduct, which can be further removed by a nitrogen oxide treatment unit downstream of the combustion assembly. Such nitrogen oxide treatment unit preferably comprises a catalytic material for catalytically reducing nitrogen oxides into nitrogen gas.

Alternatively, the energy generation unit may be a catalytic combustion assembly, such as a microturbine, for catalytic oxidation of the target components. Catalytic oxidation of the target components effectively eliminates NOx generation during the oxidation process and is therefore preferred in the present invention. Moreover, such catalytic combustion assembly not only converts the target components into thermal energy, but also electric energy that can be conveniently stored and transported for future uses. Flex-Microtrubine™ provided by FlexEnergy at Mission Viego, Calif. can be used for such catalytic oxidation, and monolithic catalytic oxidation units commercialized by Sud-Chemie Prototech, Inc. at Needham, Mass. can also be used for such purpose, as well as any other suitable catalytic combustion assemblies. Preferably, such catalytic combustion assembly can efficiently use low Btu gases (e.g., 15–20 Btu per $ft^3$) for generation of electric and thermal energy.

If the process effluent gas stream comprises hydrogen gas, or if hydrogen gas is subsequent produced as a derivative of the ammonia gas contained in such process effluent gas stream, a fuel cell assembly can be used in the energy generation unit, either independently or in combination with the combustion assembly described hereinabove, for converting the chemical energy stored in the hydrogen gas into electrical energy in the presence of catalysts and oxygen.

Such fuel cell assembly preferably comprises a stack of anodes and cathodes, forming an anode side and a cathode side. The process effluent gas stream containing hydrogen gas is passed through the anode side, while oxygen gas is passed through the cathode side, generating electrical energy and forming water as an end-product.

The electrical energy produced by such fuel cell assembly can be likewise used for heating up the ammonia dissociator or supporting the operation of the upstream semiconductor manufacturing facility, and it can also be outputted as a commercial product.

Suitable fuel cell assemblies can be readily obtained from various manufacturers. For example, H Power Corp. at Belleville, N.J. provides various proton-exchange membrane (PEM) fuel cell assemblies that can be used for the practice of the present invention.

FIG. 1 of the present application shows a schematic view of an effluent abatement/energy generation system, according to one embodiment of the present invention.

Such effluent abatement/energy generation system is arranged downstream of a GaN manufacturing facility, for receiving a process effluent gas stream 1, which contains $H_2$, $NH_3$, un-reacted precursor materials, solid particles, by-products, etc., from such facility.

The process effluent gas stream 1 is first treated in a purification unit, which comprises a filter 12, a condensation device 14, and a dry chemical scrubber 16. The filter 12 removes solid particles from the process effluent gas stream 1, forming a particle-free process effluent gas stream 2, which is then passed through the condensation unit 14. The condensation unit 14 turns the condensable components (mostly un-reacted precursor materials and by-products of large molecular weight) in the gas stream 2 into liquid condensate and removes such from the gas stream 2. The output gas stream 3 from the condensation device 14 is subsequently passed through a dry chemical scrubber 16 containing chemical scrubbing agents for removal of gaseous impurities other than hydrogen and ammonia gases from the gas effluent stream 3.

The filtered/condensed/scrubbed gas stream 4 consisting primarily of hydrogen and ammonia gases is then fed into a catalytic ammonia dissociator comprising a reaction bed 22 packed with a metal catalyst for decomposition of the ammonia gas into hydrogen and nitrogen gases at an elevated decomposition temperature of about 800° C.

The decomposed gas stream 5 is sent to the energy generation unit for generation of electrical energy using the hydrogen gas contained therein. The energy generation unit may comprise a combustion assembly 32 and/or a hydrogen fuel cell assembly 34. The hydrogen fuel cell assembly 34 comprises stacks of anodes and cathodes, an oxygen inlet, and positive/negative terminals for outputting the electrical energy so generated.

The electrical/thermal energy generated by the combustion and/or the fuel cell assemblies can be used to heat up the ammonia dissociator, and they can also be used to support operation of the upstream GaN manufacturing facility, as indicated by the arrow heads in FIG. 1.

Although the invention has been variously disclosed herein with reference to illustrative embodiments and features, it will be appreciated that the embodiments and features described hereinabove are not intended to limit the scope of the invention, and that other variations, modifications and other embodiments will suggest themselves to those of ordinary skill in the art. The invention therefore is to be broadly construed, consistent with the claims hereafter set forth.

What is claimed is:

1. An effluent abatement/energy generation system, arranged and constructed for receiving a process effluent gas stream that contains one or more target components selected from the group consisting of hydrogen gas, ammonia gas, and volatile, oxidizable organic compounds, said system comprising:
   (a) a semiconductor processing unit that generates said process effluent gas stream;
   (b) a purification unit positioned downstream of the semiconductor processing unit, wherein the purification unit removes one or more component(s) other than said target components from the process effluent gas stream; and
   (c) an energy generation unit positioned downstream of the purification unit, wherein the energy generation unit generates thermal and/or electrical energy from said target components, and/or one or more derivatives of said target components.

2. The effluent abatement/energy generation system of claim 1, wherein said purification unit comprises at least one of:
   (1) a filtering device for removing solid particles from said process effluent gas stream;
   (2) a condensation device for removing condensable components other than the target components from said process effluent gas stream;
   (3) a chemical scrubber for removing process by-products and un-reacted source reagents other than said target components from said process effluent gas stream; and
   (4) a desiccating device for removing moisture from said process effluent gas stream.

3. The effluent abatement/energy generation system of claim 1, wherein said energy generation unit comprises a combustion assembly for combusting said target components contained by said process effluent gas stream, and/or one or more derivatives of said target components, to generate thermal and/or electrical energy.

4. The effluent abatement/energy generation system of claim 3, wherein said combustion assembly comprises a microturbine for catalytically combusting said target components contained by said process effluent gas stream, and/or one or more derivatives of said target components, to generate thermal and/or electrical energy.

5. The effluent abatement/energy generation system of claim 1, wherein said energy generation unit comprises a fuel cell assembly for using said target components contained by said process effluent gas stream, and/or one or more derivatives of said target components, to generate electric energy.

6. The effluent abatement/energy generation system of claim 1, wherein said target components comprise hydrogen gas, and wherein said energy generation unit comprises a combustion assembly for using the hydrogen gas to generate thermal and/or electrical energy.

7. The effluent abatement/energy generation system of claim 6, wherein said combustion assembly comprises a microturbine for catalytically combusting the hydrogen gas to generate thermal and/or electrical energy.

8. The effluent abatement/energy generation system of claim 1, wherein said target components comprise hydrogen gas, and wherein said energy generation unit comprises a hydrogen fuel cell for using the hydrogen gas to generate electric energy.

9. The effluent abatement/energy generation system of claim 1, wherein said target components comprise ammonia gas, and wherein said energy generation unit comprises a combustion assembly for using the ammonia gas to generate thermal and/or electrical energy.

10. The effluent abatement/energy generation system of claim 9, further comprising a nitrogen oxide treatment unit downstream of said combustion assembly, for removing nitrogen oxide formed during combustion of the ammonia gas.

11. The effluent abatement/energy generation system of claim 10, wherein said nitrogen oxide treatment unit comprises a catalytic material for catalytically reducing nitrogen oxide into nitrogen gas.

12. The effluent abatement/energy generation system of claim 10, wherein at least a portion of the energy generated by the combustion assembly is used for operating the nitrogen oxide treatment unit downstream.

13. The effluent abatement/energy generation system of claim 1, wherein said target components comprise ammonia gas, wherein said system further comprises a catalytic dissociator positioned between said purification unit and said energy generation unit, for catalytically dissociating the ammonia gas into hydrogen and nitrogen gases.

14. The effluent abatement/energy generation system of claim 13, wherein said catalytic dissociator comprises a catalyzation chamber having catalytic material disposed therein, and a heating assembly for heating said catalyzation chamber to an elevated temperature sufficient for catalytic ammonia dissociation.

15. The effluent abatement/energy generation system of claim 14, wherein said catalytic material comprises one or more metals selected from the group consisting of Sc, Y, La, Ti, Zr, Hf, V, Nb, Ta, Cr, Mo, W, Mn, Re, Fe, Co, Ni, Cu, Ag, Au, Zn, Cd, Hg, Pt, Pd, Ru, Ir, and alloys thereof.

16. The effluent abatement/energy generation system of claim 14, wherein said catalyzation chamber is heated to an elevated temperature in a range of from about 500° C. to about 1200° C.

17. The effluent abatement/energy generation system of claim 14, wherein said catalyzation chamber is heated to an elevated temperature in a range of from about 700° C. to about 1000° C.

18. The effluent abatement/energy generation system of claim 13, wherein said energy generation unit comprises a combustion assembly for using the hydrogen gas formed by catalytic dissociation of the ammonia gas to generate thermal and/or electrical energy.

19. The effluent abatement/energy generation system of claim 18, wherein said combustion assembly comprises a microturbine for catalytically combusting the hydrogen gas formed by catalytic dissociation of the ammonia gas to generate thermal and/or electrical energy.

20. The effluent abatement/energy generation system of claim 13, wherein said energy generation unit comprises a hydrogen fuel cell for using the hydrogen gas formed by catalytic dissociation of the ammonia gas to generate electric energy.

21. The effluent abatement/energy generation system of claim 1, wherein said target components comprise a volatile, oxidizable organic compound, and wherein said energy generation unit comprises a combustion assembly for using said volatile, oxidizable organic compound to generate thermal and/or electrical energy.

22. The effluent abatement/energy generation system of claim 21, wherein said combustion assembly comprises a microturbine for catalytically combusting said volatile, oxidizable organic compound to generate thermal and/or electrical energy.

23. The effluent abatement/energy generation system of claim 21, wherein said volatile, oxidizable organic compound comprises an organic solvent.

24. The effluent abatement/energy generation system of claim 21, wherein said volatile, oxidizable organic compound comprises isopropanol.

25. The effluent abatement/energy generation system of claim 2, wherein said purification unit comprises the filtering device and the chemical scrubber, and wherein said chemical scrubber comprises a dry scrubber.

26. The effluent abatement/energy generation system of claim 2, wherein said purification unit comprises the filtering device, the chemical scrubber, and the desiccating device, and wherein said chemical scrubber comprises a wet scrubber or a wet-dry combination scrubber.

27. A method for abating a process effluent gas stream from a semiconductor manufacturing facility that contains one or more target components selected from the group consisting of hydrogen gas, ammonia gas, and volatile, oxidizable organic compounds, and concurrently using said process effluent gas stream to generate energy, comprising the steps of:

(a) receiving the process effluent gas stream from said upstream semiconductor manufacturing facility;

(b) removing one or more components other than said target components from the process effluent gas stream; and (c) using the target components contained by the process effluent gas stream and/or one or more derivatives of such target components to generate thermal and/or electric energy.

28. The method of claim 27, wherein step (b) is effectuated using at least one device selected from the group consisting of:

(1) a filtering device for removing solid particles from said process effluent gas stream;

(2) a condensation device for removing condensable components other than the target components from said process effluent gas stream;

(3) a chemical scrubber for removing process by-products and un-reacted source reagents other than said target components from said process effluent gas stream; and (4) a desiccating device for removing moisture from said process effluent gas stream.

29. The method of claim 27, wherein step (c) is effectuated using a combustion assembly for generating thermal and/or electrical energy from said target components contained by said process effluent gas stream, and/or one or more derivatives of said target components.

30. The method of claim 29, wherein said combustion assembly comprises a microturbine for catalytically combusting said target components contained by said process effluent gas stream, and/or one or more derivatives of said target components, to generate thermal and/or electrical energy.

31. The method of claim 27, wherein step (c) is effectuated using a fuel cell assembly for generating electric energy from said target components contained by said process effluent gas stream, and/or one or more derivatives of said target components.

32. The method of claim 27, wherein said target components comprise hydrogen gas, and wherein a combustion assembly is used in step (c) for generating thermal and/or electric energy from the hydrogen gas.

33. The method of claim 32, wherein said combustion assembly comprises a microturbine for catalytically combusting the hydrogen gas to generate thermal and/or electrical energy.

34. The method of claim 27, wherein said target components comprise hydrogen gas, and wherein a hydrogen fuel cell is used in step (c) for generating electric energy from the hydrogen gas.

35. The method of claim 27, wherein said target components comprise ammonia gas, and wherein a combustion assembly is used in step (c) for generating thermal and/or electric energy from the ammonia gas.

36. The method of claim 35, wherein a nitrogen oxide treatment unit is arranged downstream said combustion assembly, for removing nitrogen oxide formed during combustion of the ammonia gas.

37. The method of claim 36, wherein said nitrogen oxide treatment unit comprises a catalytic material for catalytically reducing nitrogen oxide into nitrogen gas.

38. The method of claim 36, wherein at least a portion of the energy generated by the combustion assembly is used for operating the nitrogen oxide treatment unit downstream.

39. The method of claim 27, wherein said target components comprise ammonia gas, wherein a catalytic dissociator is used for catalytically dissociating the ammonia gas into hydrogen and nitrogen gases after said target components have been removed from said process effluent gas stream and before components of said ammonia gas is used to generate thermal or electrical energy.

40. The method of claim 39, wherein said catalytic dissociator comprises a catalyzation chamber having catalytic material disposed therein, and a heating assembly for heating said catalyzation chamber to an elevated temperature sufficient for catalytic ammonia dissociation.

41. The method of claim 40, wherein said catalytic material comprises one or more metals selected from the group consisting of Sc, Y, La, Ti, Zr, Hf, V, Nb, Ta, Cr, Mo, W, Mn, Re, Fe, Co, Ni, Cu, Ag, Au, Zn, Cd, Hg, Pt, Pd, Ru, Ir, and alloys thereof.

42. The method of claim 40, wherein said catalyzation chamber is heated to an elevated temperature in a range of from about 500° C. to about 1200° C.

43. The method of claim 40, wherein said catalyzation chamber is heated to an elevated temperature in a range of from about 700° C. to about 1000° C.

44. The method of claim 39, wherein the hydrogen and nitrogen gases formed by catalytic ammonia dissociation is passed to a combustion assembly, which uses the hydrogen gas so formed to generate thermal and/or electrical energy.

45. The method of claim 44, wherein said combustion assembly comprises a microturbine for catalytically combusting the hydrogen gas formed by catalytic ammonia dissociation to generate thermal and/or electrical energy.

46. The method of claim 39, wherein the hydrogen and nitrogen gases formed by catalytic ammonia dissociation is passed to a hydrogen fuel cell, which uses the hydrogen gas so formed to generate electric energy.

47. The method of claim 27, wherein said target components comprise a volatile, oxidizable organic compound, and wherein a combustion assembly is used in step (c) for generating thermal and/or electrical energy from said volatile, oxidizable organic compound.

48. The method of claim 47, wherein said combustion assembly comprises a microturbine for catalytically combusting said volatile, oxidizable organic compound to generate thermal and/or electrical energy.

49. The method of claim 47, wherein said volatile, oxidizable organic compound comprises an organic solvent.

50. The method of claim 47, wherein said volatile, oxidizable organic compound comprises isopropanol.

51. The method of claim 28, wherein a filtering device and a chemical scrubber are used for effectuating step (b), and wherein said chemical scrubber comprises a dry scrubber.

52. The method of claim 28, wherein a filtering device, a chemical scrubber, and a desiccating device are used for effectuating step (b), and wherein said chemical scrubber comprises a wet scrubber or a wet-dry combination scrubber.

53. The effluent abatement/energy generation system of claim 1, wherein the semiconductor processing unit comprises at least one of:

(1) a GaN manufacturing facility;

(2) a SiN manufacturing facility;

(3) a CVD or MOCVD processing facility;

(4) a silicon epitaxy processing facility; and (5) a nitrification facility.

54. An effluent abatement/energy generation system, arranged and constructed for receiving a process effluent gas stream from a semiconductor processing unit that contains one or more target components selected from the group consisting of hydrogen gas, ammonia gas, and volatile, oxidizable organic compounds, said system comprising:

(a) a purification unit positioned downstream of the semiconductor processing unit, wherein the purification unit removes one or more component(s) other than said target components from the process effluent gas stream;

(b) an energy generation unit positioned downstream of the purification unit, wherein the energy generation unit generates thermal and/or electrical energy from said target components, and/or one or more derivatives of said target components; and (c) a catalytic dissociator positioned between said purification unit and said energy generation unit, for catalytically dissociating any ammonia gas in said process effluent gas stream into hydrogen and nitrogen gases.

55. The method of claim 54, wherein said catalytic dissociator comprises a catalyzation chamber having catalytic material disposed therein, and a heating assembly for heating said catalyzation chamber to an elevated temperature sufficient for catalytic ammonia dissociation.

56. The method of claim 55, wherein said catalytic material comprises one or more metals selected from the group consisting of Sc, Y, La, Ti, Zr, Hf, V, Nb, Ta, Cr, Mo, W, Mn, Re, Fe, Co, Ni, Cu, Ag, Au, Zn, Cd, Hg, Pt, Pd, Ru, Ir, and alloys thereof.

57. The system of claim 54, wherein the ammonia gas is catalytically into hydrogen and nitrogen gases under pressure of about 5 psig to about 15 psig.

* * * * *